United States Patent [19]

Pease et al.

[11] Patent Number: 4,575,627
[45] Date of Patent: Mar. 11, 1986

[54] MOLDED LIGHT PEN WITH LENS WITH WATER IMPERVIOUS HOUSING

[75] Inventors: Logan L. Pease; Wes F. Carmean; Robert A. Luciano, all of Reno, Nev.

[73] Assignee: IGT, Reno, Nev.

[21] Appl. No.: 532,502

[22] Filed: Sep. 14, 1983

[51] Int. Cl.[4] .............................................. H01J 5/16
[52] U.S. Cl. ..................................... 250/227; 235/472
[58] Field of Search ........................ 250/227; 235/472; 350/96.1; 382/59

[56] References Cited

U.S. PATENT DOCUMENTS

| | | | |
|---|---|---|---|
| 3,749,932 | 7/1973 | Jones | 250/227 |
| 3,758,782 | 9/1973 | Radford et al. | 250/227 |
| 3,761,620 | 9/1973 | Graven | 250/227 |
| 4,039,845 | 8/1977 | Oberhänsli et al. | 250/227 |
| 4,109,146 | 8/1978 | Hillman | 235/472 |
| 4,152,075 | 5/1979 | Rellstab et al. | 250/227 |
| 4,490,607 | 12/1984 | Pease et al. | 250/227 |

*Primary Examiner*—David C. Nelms
*Assistant Examiner*—J. Gatto
*Attorney, Agent, or Firm*—Townsend and Townsend

[57] ABSTRACT

A fibre optic light pen including a hollow elongate cylindrical housing having a tip portion and a base portion, and having an elongate cylindrical actuator positioned for axial movement relative to and within said housing tip portion is described. The actuator is operable between an extended position at which the actuator point portion projects outwardly from the housing tip portion, and a retracted position at which the actuator point portion is pressed within the housing hollow tip portion. An axial bore extends through the actuator and contains therein a light conductive rod which extends axially along said bore from the actuator's point portion to the actuator's base portion. A fibre optic light conductor is secured within the hollow housing base portion in such a manner that the light conductive rod focuses light on the light conductor when the actuator is recessed within the hollow tip portion of the housing. When the actuator extends from the hollow tip housing portion, the light conductive rod is moved by the actuator away from the fibre optic light conductor such that light is not transmitted to the light conductor from the light conductive rod. The invention also includes a switch that produces a switching signal when the actuator is recessed within the hollow housing.

8 Claims, 7 Drawing Figures

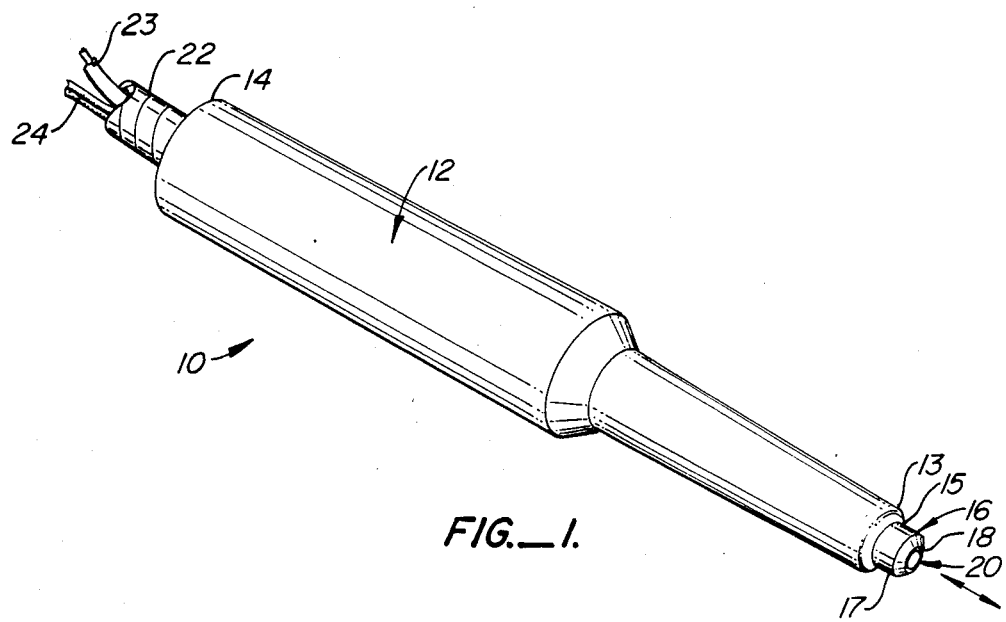
FIG._1.
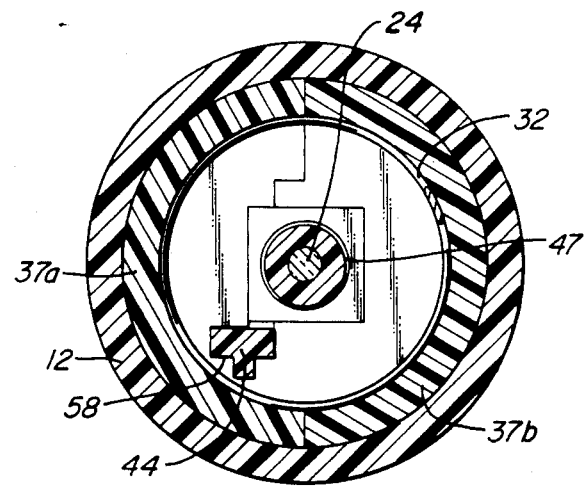
FIG._4.

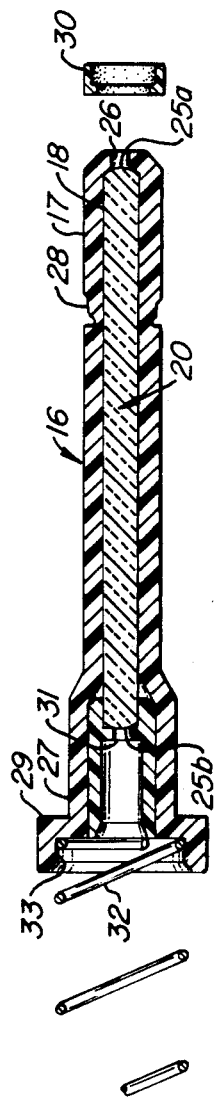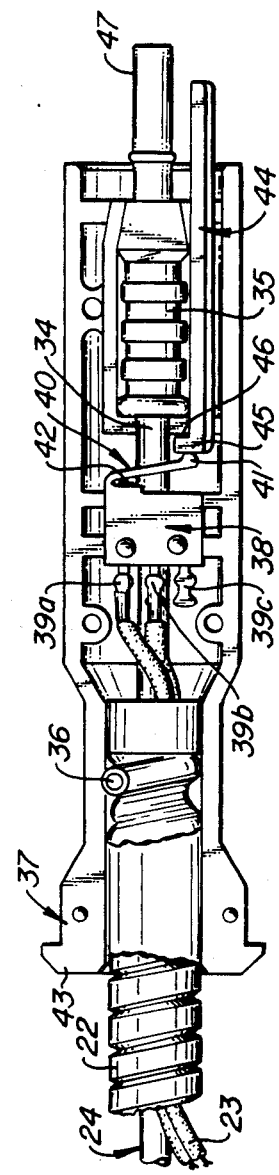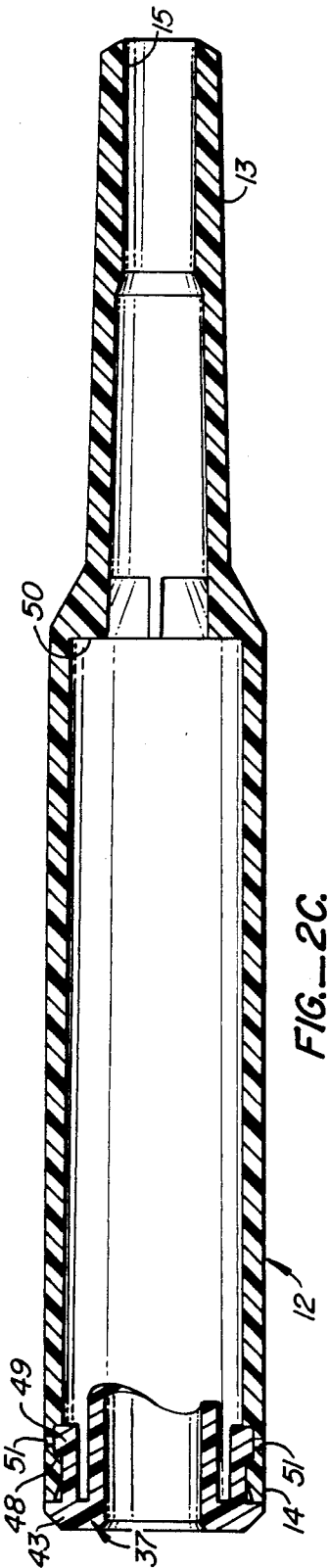
FIG.—2A.  FIG.—2B.  FIG.—2C.

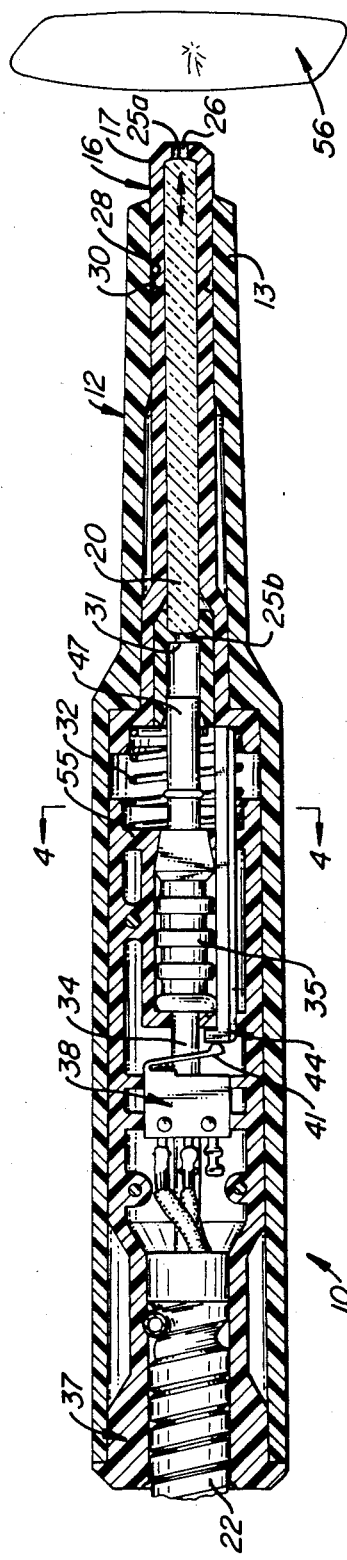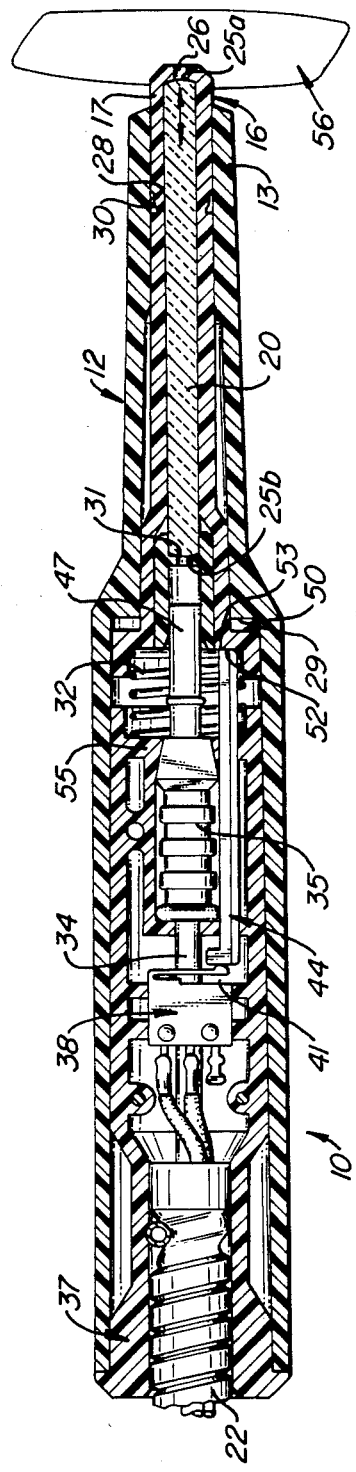

MOLDED LIGHT PEN WITH LENS WITH WATER IMPERVIOUS HOUSING

BACKGROUND OF THE INVENTION

1. Field of the Invention

The present invention relates to a light pen for detecting a selected display event and for producing an actuating response thereto. More particularly, the present invention relates to a light pen wherein light from a light source is propagated along a light conductive fibre cable for processing at a remote location.

2. Description of the Prior Art

Light pens for detecting display events and for producing actuating signals responsive thereto are well known and of many types. Typically, such light pens are of cylindrical shape and include a tip portion which may be pressed to a selected display location by a user. Light produced by the display at that location is coupled to an internal photo detector or to a fibre optic cable, by which the light is transmitted to a remotely located photoelectric device. Such prior art light pens are exemplified by the device entitled "Pressure Actuated Light Pen", U.S. Pat. No. 4,109,146, issued to Hillman on Aug. 22, 1978. A more recent type of light pen, including a fibre optic cable and a switching device, is described in pending U.S. patent application No. 400,796 now U.S. Pat. No. 4,490,607, entitled "Fibre Optic Light Pen," filed July 22, 1982, and assigned to IGT Corporation of Reno, Nevada, the assignee of the present invention.

Light pens are often used in hostile environments, such as bars, casinos, and classrooms. In gaming applications, for devices such as video poker machines and the like, light pens are often placed by careless users in ashtrays full of partially extinguished smoking materials and beverage glasses which may still retain amounts of a partially consumed liquid refreshment. Such light pens are often the subject of abuse resulting from emotional disappointment accompanying a loss. Needless to say, light pens are regularly damaged and often need to be replaced. The need for constant servicing of damaged light pens is an expense that reduces the profitability to the casino operator of the associated gaming device. Light pens have also been expensive to manufacture. The gaming device manufacturer may pay between $350–400 to purchase a prior art type light pen, only to replace it after a gamester has thoughtlessly left the pen partially submerged in the contents of a beverage container.

SUMMARY OF THE INVENTION

The present invention provides an improved fibre optic light pen formed of a molded plastic or other such material in such manner that the light pen is inexpensive to manufacture and assemble. Accordingly, the present invention provides an ideal light pen for use in abusive environments, such as bars, casinos, and classrooms.

The invention includes a one piece hollow elongate cylindrical housing which has a tip portion and a base portion. An elongate cylindrical actuator, again molded in one piece from a plastic material, is produced so that it may be inserted through the housing's base portion and into the housing's tip portion, where it is retained for axial movement relative to the housing tip portion. The actuator includes a point portion that is urged outwardly beyond the tip portion of the housing by a spring biasing device.

An axial bore extends through the actuator from the point portion to the base portion and includes a cylindrical glass rod extending therethrough by which a light source, such as light from a display, may be conducted from the point portion to the base portion of the actuator. The actuator is slidably movable within the tip portion of the housing such that a pen user may press the point of the actuator to the display and accordingly depress the actuator within the housing's hollow tip portion to recess the actuator point therein.

The base portion of the hollow housing includes a connector for securing a fibre optic cable first terminal end portion to the housing. When the actuator is outwardly biased, light entering the light pen through the light conductive glass rod is not presented to the fibre optic cable and therefore is not conducted along the cable to a remote photosensing device for further processing.

When a user presses the actuator point to a light source, such as a video display, the glass rod is brought in proximate relation to the first terminal end of the fibre optic cable, and light present at the light source is thereby communicated to and focused onto the fibre optic cable. Accordingly, the present invention provides an indication of light present at a selected display location only when a display location selection is made. Such selection is made by the user by pressing the light pen to the display to recess the actuator point into the hollow tip portion of the housing.

The present invention also includes the lever action switch that is operated to produce a switching signal when the actuator is depressed during the display location selection process. Such switching signal may be used to provide a reliable indication of display location selection while the light signal conducted by the fibre optic cable provides an indication of light level at the selected display location.

One important aspect of the invention is a fluid-impermeable seal between the actuator and the housing. If the light pen is carelessly left dangling in the liquid contents of a beverage container, the inside of the light pen remains undampened and undamaged because seepage of the liquid therein is accordingly prevented. Thus, the present invention may sustain significant amounts of different types of abuse without requiring expensive and time-consuming repair or replacement.

BRIEF DESCRIPTION OF THE DRAWINGS

FIG. 1 is a perspective view of a preferred embodiment of the present invention;

FIG. 2a is a cross-sectional view of an actuator portion of a preferred embodiment of the present invention;

FIG. 2b is a cross-sectional view of an inner switch assembly and fibre optic cable assembly of the preferred embodiment of the present invention;

FIG. 2c is a cross-sectional view of an outer housing portion of the preferred embodiment of the present invention;

FIG. 3a is a cross-sectional assembly view of the preferred embodiment of the present invention, showing the actuator in an extended position;

FIG. 3b is a cross-sectional assembly view of the of the preferred embodiment of the present invention showing the actuator in a depressed position; and FIG. 4 is a sectional view of the preferred embodiment of the present invention taken through lines 4—4 of FIG. 3a.

DETAILED DESCRIPTION OF A PREFERRED EMBODIMENT

The present invention is a fibre optic light pen 10 which is shown in perspective in FIG. 1. A one piece molded elongate cylindrical housing 12 is shown including a tip portion 13 and a base portion 14. A tip portion 17 of an actuator 16 is freely movable in and out of an opening 15 extending through hollow housing tip portion 13. Actuator 16 includes an axial bore 18 extending therethrough which contains a light conductive glass rod 20. The housing base portion 14 includes a cable sheath 22 which encloses and protects a pair of electrical conductors 23 and a light-conductive fibre optic cable 24.

Actuator 16 is shown in a cross sectional view in FIG. 2a. The actuator includes a chamferred groove 28 which provides a seat for an encircling resilient coaxial seal 30, which may be made of rubber, plastic, or any other such resilient material. One end of the light conductive glass rod 20 forms a first lens end 25a that is positioned at the terminus of actuator point portion 17, for receiving light emitted through actuator light opening 26. A second lens 25b is formed at the opposite end of the conductive glass rod 20, and is positioned near a second light opening 31.

Actuator 16 includes a base portion 27 having a retaining abutment surface 29. Actuator base portion 27 also includes a recess 33 for receiving an actuator biasing member, such as coil spring 32.

An inner switch and light conductor termination assembly 37 is shown in cross sectional view in FIG. 2b. Assembly 37 includes a base portion 43 which receives sheath 22 and which includes a retaining pin 36 for securing sheath 22 within assembly base portion 43.

A switch 38 is shown including a plurality of terminals 39a-39c—two of which are connected to electrical conductors 23. The switch is shown having a plurality of terminals to provide, as desired, either or both of normally open and closed switch operations upon user selection of a display location. Switch 38 is of the lever actuated type and includes a lever member 40 having a cam surface 41 which, when pressed, forces lever 40 against a switch button 42 to actuate the switch.

An extension member 44 is shown including projecting outwardly from assembly 37 and includes a cam actuator surface 45 in contact with switch lever cam 41. The extension member is axially movable relative to assembly 37 and housing 12 (as explained below) such that user selection of a display location produces a switch-actuating movement of the extension member.

Fibre optic cable 24 is shown extending into the termination assembly 37 and ending in a first terminal portion 34 that is received by and coupled to a fibre optic cable connector and terminator 35. Fibre optic cable connector 35, in turn, provides a light receptacle 47, at which light may be received for conduction along fibre optic cable 24.

Housing 12, shown in cross sectional view in FIG. 2c is a one piece elongate cylindrical structure. Opening 15 extends entirely through the housing from tip portion 13 to base portion 14. Housing 12 includes a flat abutment surface 50 which is complementary to actuator abutment surface 29, and by which the actuator is retained within said housing, as discussed more fully below.

Base portion 43 of assembly 37 is shown in locking engagement with housing base 14. Assembly 37 is securely retained within the housing by an interlocking base groove 48 and assembly pawl 49. Assembly pawl 49 may include a tapered surface to assure smooth and easy engagement of assembly 37 with housing 12, while preventing disengagement of the assembly therefrom during normal use of the light pen. Assembly pawl 49 is preferably formed on each of two assembly sections (37a/37b as shown in FIG. 4). Accordingly, a pawl is shown for each section in FIG. 2C. While no pawl is visible in FIG. 2b, one is provided for assembly 37.

A tiny access hole 51 may be provided in housing 12. Assembly 37 may be readily released from housing 12 for light pen disassembly or repair by insertion of a pointed tool (not shown) through hole 51, such that pawl 49 is pushed out of engagement within groove 48.

Operation of the present invention is most readily understood by referring to FIG. 3a, which is a cross sectional assembly view of the light pen with actuator 16 in an extended position, and FIG. 3b, which is a cross sectional assembly view of the light pen actuator 16 in a depressed position. Referring first to FIG. 3a, light pen 10 is shown in its normal or non-selecting position, that is, when the light pen is not used to make an actual display selection. The light pen may be positioned proximate to or otherwise within the vicinity of the display with which it is associated, such as display screen 56, but it is not in contact with display and selection is not being made at that time. Sheath 22 typically connects the light pen to a display cabinet (not shown) and is preferably of a coiled steel construction, as is provided on pay telephones. Such sheath construction discourages vandalism or theft of the light pen.

When a selection is not made, actuator 16 is outwardly biased axially along the tip portion 13 by the expansion of spring 32 which presses against actuator recess 33 and a spring surface 55 of assembly 37. This outward bias causes actuator point portion 17 to extend out of the end of tip portion 13. Extension of actuator point portion 17 is limited when retaining abutment surface 29 is pressed into contact with housing abutment surface 50. With actuator 16 biased in this extended condition, light receptacle 47 is spaced a distance from lens portion 25b of light conductive glass rod 20, such that light entering actuator 16 through opening 26 is not focused onto fibre optic cable first terminal portion 34. Additionally, extension member 44 is forced away from switch 48 by the spring action of switch lever 41, until extension member tip portion 53 is brought into abutment with a switch actuator surface 52 of actuator 16.

Referring to FIG. 3b, actuator point 17 is shown pressed against the display surface 56. Light present at the display surface is admitted in actuator 16 through opening 26 and conducted along glass rod 20 to actuator light opening 31. Glass rod lens portions 25a and 25b form a simple lens train by which light conducted along the glass rod is focused through opening 31 and onto light receptacle 47. Thereafter, light is conducted along the fibre optic cable to a remote location where it is processed as desired.

When the light pen is pressed against a display or other light providing surface, the light rod lens train consisting of lens portions 25a and 25b is moved proximate to light receptacle 47 and optical coupling is produced therebetween. Depressing actuator 16 during the display selection process compresses spring 32. The display selection process also forces actuator abutment surface 29 away from housing abutment surface 50. At the same time, actuator switch surface 52 presses against extension member point portion 53. Resulting movement of the actuator within the housing forces the extension member to press against cam 41 and actuate switch 38.

Accordingly, user selection of a particular display event causes light to be focused onto the first terminal portion of the fibre optic cable for transmission along the cable to a remote location. Such selection also produces actuation of switch 38 to produce a corresponding switch actuation signal which may also be used at the remote location.

As shown in FIGS. 3a and 3b, resilient seal 30 prevents the entry of fluids of all types into the housing assembly, while allowing free movement of the actuator into and out of the hollow housing tip portion during the display selection process. In this way, the present invention may be used in abusive environments. Because a one piece hole and fluid-impermeable seal are provided, the light pen may be carelessly immersed in fluids and otherwise be subjected to rough handling without suffering disabling damage.

A sectional view of the light pen taken along lines 4—4 of FIG. 3a is shown in FIG. 4. In the Fig., it is shown that housing 12 is a one piece assembly that may readily be molded of plastic or other such molded materials, or may be cast or otherwise formed as a one piece portion of the invention. Assembly 37 is shown as having two sections 37a and 37b, each of which may be molded as desired, but which are preferably molded of a plastic material as is the housing. Extension member 44 is shown movable within a channel 58, which also formed within assembly 37. Spring 32 is shown in the Fig. as is light receptacle 47. Additionally, the end portion of fibre optic cable 24 is shown in the Fig.

The foregoing was given for purposes of illustration and example of a preferred embodiment of the present invention. It is contemplated that various equivalent embodiments of the present invention may be constructed. For example, the glass light conductive rod may be made of other light conductive materials, such as various types of plastic or ceramic materials. Additionally, the molded housing, actuator, and assembly portions of the invention may be made of plastic materials by injection or blow molding processes or other such plastic molding processes, or they may be made of other materials, such as metal formed by any of the various casting processes. Additionally, switch operation may be of a normally open or normally closed type or may be a multiple switch contact closure, such as in a double-pole-double-throw switch arrangement. The coil or helical spring could also be a resilient strip or other such biasing member. Accordingly, the scope of the invention should be limited only by the breadth of the claims.

We claim:

1. A fiber optic light pen adapted to be connected to a fiber optic cable for transmission of light pulses to a processing unit, the light pen comprising:
an elongated, water impervious, tubular member having first and second open ends;
a tubular insert extending from the first open end into an interior of the housing and terminating at a point spaced from the second open end;
means carried by the insert for securing a fibre optic cable to the insert so that an end face of the cable is substantially coaxially disposed within the housing, faces towards the second open end, and is at a fixed axial location within the housing;
means for securing the insert to the housing and preventing relative axial movements of the insert in the housing;
a generally tubular actuator axially movably disposed within the housing and extending through the second open end thereof, the actuator having an outer end including a coaxial light aperture and an inner end spaced from the insert;
means defined by the housing and the actuator for guiding the actuator during its relative axial movements within the housing;
means limiting axial movements of the actuator within the housing to movements between spaced apart first and second positions arranged so that the outer end of the actuator is disposed exteriorly of the housing in its first and second positions;
means for biasing the actuator into the first position;
means forming a watertight seal between the actuator and the housing;
an elongated light conducting rod disposed interiorly of the actuator and extending from proximate the light aperture towards the fiber optic cable end face so that the rod is spaced from the end face when the actuator is in the first and second positions, the rod and the actuator being in firm engagement with each other over substantially their full common lengths, whereby liquid is prevented from passing therebetween, the rod being shaped so that it focuses light entering through the aperture on the fiber optic cable end face when the actuator is in the second position and so that it focuses the light in a plane other than the fiber optic cable end face when it is in the first position;
an electric switch carried by the insert and spaced from the inner end of the actuator, the switch being adapted to generate a signal perceptible by a person using the light pen when it is operated; and
means operatively coupled with the switch and the actuator for operating the switch when the actuator is moved between the first and second positions.

2. A fiber optic light pen adapted to be connected to a fiber optic cable for transmission of light pulses to a processing unit, the light pen comprising:
an elongated, water impervious tubular member having first and second open ends;
a tubular insert extending from the first open end into an interior of the housing and terminating at a point spaced from the second open end;
means carried by the insert for securing a fiber optic cable to the insert so that an end face of the cable is substantially coaxially disposed within the housing, faces towards the second open end, and is at a fixed axial location within the housing;
means for axially immovably securing the insert to the housing;
a generally tubular actuator axially movably disposed within the housing and extending through the second open end thereof, the actuator having an outer end including a coaxial light aperture and an inner end spaced from the insert;
means defined by the housing and the actuator for guiding the actuator during its relative axial movements within the housing;

means limiting axial movements of the actuator within the housing to movements between spaced apart first and second positions arranged so that the outer end of the actuator is disposed exteriorly of the housing in its first and second positions;

spring means disposed between the actuator and the insert for biasing the actuator into the first position;

means forming a watertight seal between the actuator and the housing for preventing liquid from entering the housing through the second open end thereof;

an elongated light conducting rod disposed interiorly of the actuator and extending from proximate the light aperture towards of the fiber optic cable end face so that the rod is spaced from the end face when the actuator is in the first and second positions, the rod being in engagement with the actuator over substantially their entire common length, the rod being shaped so that it focuses light entering through the aperture on the fiber optic cable end face when the actuator is in the second position and so that it focuses the light in a plane other than the fiber optic cable end face when it is in the first position; and means carried by the housing and adapted to generate a signal perceptible by a person using the light pen when the actuator is moved between the first and second positions.

3. A fiber optic light pen adapted to be connected to a fiber optic cable for transmission of light pulses to a processing unit, the light pen comprising:

an elongated tubular member having first and second open ends;

a tubular insert extending from the first open end into an interior of the housing and terminating at a point spaced from the second open end, the insert including a snap-in connector permitting the slidable insertion of the connector into the housing and preventing a seaparation of the insert from the housing after engagement of the snap-in connector;

means carried by the insert for securing a fiber optic cable to the insert so that an end face of the cable is substantially coaxially disposed within the housing, faces towards the second open end, and is at a fixed axial location within the housing;

a generally tubular actuator axially movably disposed within the housing and extending through the second open end thereof, the actuator having an outer end including a coaxial light aperture and an inner end spaced from the insert;

means defined by the housing and the actuator for guiding the actuator during its relative axial movements within the housing;

means limiting axial movements of the actuator within the housing to movements between spaced apart first and second positions arranged so that the outer end of the actuator is disposed exteriorly of the housing in its first and second positions;

means for biasing the actuator into the first position; and lens means disposed interiorly of the actuator and extending from proximate the light aperture towards the location of the fiber optic cable end face so that the lens means is spaced from the end face when the actuator is in the first and second positions, the lens means being shaped so that it focuses light entering through the aperture on the fiber optic cable end face when the actuator is in the second position and so that it focuses the light in a plane other than the fiber optic cable end face when it is is in the first position.

4. A light pen according to claim 3 including an electric switch carried by the insert and spaced from the inner end of the actuator, the switch being adapted to generate a signal perceptible by a person using the light pen when it is operated, and means operatively coupled with the switch and the actuator for operating the switch when the actuator is moved between the first and second positions.

5. A light pen according to claim 3 wherein the snap-in connector comprises means carried by one of the housing at the insert and defining a relatively flexible skirt, and engaging surfaces defined by the skirt and the other one of the housing and the insert, oriented substantially perpendicular to the housing axis and arranged so that the surfaces are in abutment when the insert is fully disposed within the housing to thereby lock the insert to the housing.

6. A light pen according to claim 5 including means accessible from an exterior of the housing for moving the skirt to disengage the engaging surfaces and thereby release the connection between the housing at the insert.

7. A light pen according to claim 6 wherein the skirt moving means comprises an opening in the housing proximate the first end thereof.

8. A light pen according to claim 4 including means between the housing and the actuator establishing a watertight seal, wherein the lens means is defined by an elongated, transparent rod, and wherein the rod and the actuator are in engagement over substantially their entire common length so that water is prevented from passing therebetween.

* * * * *